United States Patent
Tan et al.

(10) Patent No.: US 11,360,224 B2
(45) Date of Patent: Jun. 14, 2022

(54) INVERSION, MIGRATION, AND IMAGING RELATED TO ISOTROPIC WAVE-MODE-INDEPENDENT ATTENUATION

(71) Applicant: ExxonMobil Upstream Research Company, Spring, TX (US)

(72) Inventors: Sirui Tan, Spring, TX (US); John E. Anderson, Conroe, TX (US); Sunwoong Lee, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 124 days.

(21) Appl. No.: 16/806,660

(22) Filed: Mar. 2, 2020

(65) Prior Publication Data

US 2020/0348430 A1 Nov. 5, 2020

Related U.S. Application Data

(60) Provisional application No. 62/842,634, filed on May 3, 2019.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 1/306* (2013.01);
(Continued)

(58) Field of Classification Search
CPC ........ G01V 1/282; G01V 1/303; G01V 1/306; G01V 2210/51; G01V 2210/614; G01V 2210/675; G01V 2210/679
See application file for complete search history.

(56) References Cited

U.S. PATENT DOCUMENTS 8,756,042 B2 6/2014 Tan et al.
9,977,141 B2 5/2018 Liu
(Continued)

OTHER PUBLICATIONS

Carcione, J. (2015) "Wave Fields in Real Media (Third Edition) Wave Propagation in Anisotropic, Anelastic, Porous and Electromagnetic Media", Elsevier, pp. 199-204.
(Continued)

*Primary Examiner* — Elias Desta
(74) *Attorney, Agent, or Firm* — ExxonMobil Upstream Research Company—Law Department (57) ABSTRACT

A method and apparatus for identifying features of a subsurface region, including: obtaining an initial physical property model and survey data for the subsurface region; identifying a current model to be the initial physical property model; and executing one or more iterations of: generating synthetic data and forward wavefields with the current model and the survey data by forward modeling with forward wave equations representing isotropic wave-mode-independent attenuation; generating adjoint wavefields with the synthetic data and the survey data by adjoint modeling with adjoint wave equations representing isotropic wave-mode-independent attenuation; computing an objective function gradient with the forward wavefields and the adjoint wavefields by solving gradient equations with the corresponding wave equations representing isotropic wave-mode-independent attenuation; computing a search direction of the objective function; searching for a possible improved model along the search direction; and updating the current model to be the possible improved model.

29 Claims, 5 Drawing Sheets

(52) U.S. Cl.
CPC .... *G01V 2210/51* (2013.01); *G01V 2210/614* (2013.01); *G01V 2210/675* (2013.01); *G01V 2210/679* (2013.01)

(56) References Cited

U.S. PATENT DOCUMENTS

| | | | |
|---|---|---|---|
| 2012/0209526 A1* | 8/2012 | Imhof | G01V 11/00 |
| | | | 702/5 |
| 2015/0362622 A1 | 12/2015 | Denli et al. | |
| 2017/0248716 A1* | 8/2017 | Poole | G01V 1/28 |
| 2017/0371050 A1* | 12/2017 | Sun | G01V 1/40 |

OTHER PUBLICATIONS

Emmerich et al. (1987) "Incorporation of attenuation into time-domain computations of seismic wave fields", Geophysics, vol. 52, No. 9, Sep. 1987, pp. 1252-1264.

Gazdag, J. (1978) "Wave equation migration with the phase-shift method": Geophysics, vol. 43, No. 7, Dec. 1978, pp. 1342-1351.

Gazdag, J. and Sguazzero, P. (1984) "Migration of seismic data by phase shift plus interpolation": Geophysics, vol. 49, No. 2, Feb. 1984, pp. 124-131.

Jiao, J., Lowrey, D., Willis, J., and Solano, D. (2006) "An improved methodology for sub-salt velocity analysis", SEG Expanded Abstracts, vol. 25, issue 1, pp. 3105-3109.

Liu, Z. (1997) "An analytical approach to migration velocity analysis", Geophysics, vol. 62, No. 4, Jul.-Aug. 1997, pp. 1238-1249.

MacKay et al. (1992) "Imaging and velocity estimation with depth focusing analysis", Geophysics, vol. 57, No. 12, Dec. 1992, pp. 1608-1622.

Moczo, P. and Kristek, J. (2005) "On the rheological models used for time-domain methods of seismic wave propagation", Geophysical Research Letters, vol. 32, Issue 1, L01306, pp. 1-5.

Sava et al. (2006) "Time-shift imaging condition in seismic migration", Geophysics, vol. 71, No. 6, Nov.-Dec. 2006, pp. S209-S217.

Tromp, J., Tape, C. and Liu, Q. (2005) "Seismic tomography, adjoint methods, time reversal and banana-doughnut kernels", Geophysical Journal International, vol. 160, Issue 1, Jan. 2005, pp. 195-216.

Wang et al. (2006) "A 3D subsalt tomography based on wave-equation migration-perturbation scans", Geophysics, vol. 71, No. 2, Mar.-Apr. 2006, pp. E1-E6.

Wang, Y. (2009) "Seismic inverse Q filtering", John Wiley & Sons, pp. 1-4.

Zhu and Tsvankin (2006) "Plane-wave propagation in attenuative transversely isotropic media", Geophysics, vol. 71, No. 2, Mar.-Apr. 2006, pp. T17-T30.

\* cited by examiner

INVERSION, MIGRATION, AND IMAGING RELATED TO ISOTROPIC WAVE-MODE-INDEPENDENT ATTENUATION

CROSS REFERENCE TO RELATED APPLICATION

This application claims the priority of U.S. Provisional Application No. 62/842,634, filed May 3, 2019, the disclosure of which is incorporated herein by reference in its entirety.

FIELD

This disclosure relates generally to the field of geophysical prospecting and, more particularly, to seismic prospecting for hydrocarbon management and related data processing. Specifically, exemplary embodiments relate to methods and apparatus for improving computational accuracy and/or efficiency during viscoelastic inversion, migration, and/or imaging analysis.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface geologic structures. For example, seismic data may be gathered and processed to generate subsurface models that reveal geologic structure. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones or hydrophones or accelerometers). The seismic data received by the seismic sensors is processed in an effort to create an accurate mapping of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, one or more inversion procedures may be utilized to analyze the geophysical data and produce subsurface properties and/or seismic images. Generally, inversion is a procedure that finds a geophysical parameter model (e.g., a velocity model, in which each unit or cell within the model has associated with it a value indicating velocity with which seismic waves would travel through a portion of the subsurface corresponding to that cell), or a collection of models, which, through simulation of some physical response to those parameters, can reproduce to a chosen degree of fidelity a set of measured data. Inversion procedures typically iteratively compare simulated data to measured data until the results converge, or for a specified number of iterations if convergence fails. For example an objective function may be optimized to seek the convergence.

A particular type of inversion, Full Wavefield Inversion (FWI), simulates seismic waves in a subsurface region and attempts to match the measured seismic response. FWI is a nonlinear inversion technique utilizing an earth model that includes multiple parameters: P- and S-wave velocities, density, anisotropy, attenuation, etc. FWI can be a very challenging computational problem because the amount of data to be simulated is large (comprising a full 3-D seismic acquisition), and simulated seismic waves are sensitive to not only a large volume of the earth, but to relatively fine-scale variations in properties within that volume. Therefore, naive parameterization of a subsurface model (e.g., by uniform discretization) may require many volume elements (voxels) of uniform elastic properties to match simulated data to the observed seismic data.

FWI generally starts with an initial subsurface physical property model. Synthetic seismic data may be generated (e.g., modeled or simulated) based on the physical property model by solving a wave equation using a numerical scheme (e.g., finite-difference, finite-element, etc.). The synthetic data may be compared with the observed seismic data. Difference between the synthetic and observed data may generate an error or objective function (e.g., a measure of the misfit between the synthetic and observed data). Using the objective function, a modified subsurface model may be generated, which may be used to generate a new set of synthetic seismic data. This new set of synthetic seismic data may be compared with the observed data to generate a new objective function. This process may be repeated until the objective function is satisfactorily minimized, thereby generating the final subsurface model. Earth parameters may be reconstructed individually by single-parameter FWI or simultaneously by multi-parameter FWI.

A local optimization method may be used to minimize a local objective function and to update the subsurface model. For example, an optimization procedure for FWI may involve (1) selecting a starting model; (2) computing a search direction; and (3) searching for a potentially improved model that is a perturbation of the model in that search direction. The local objective function optimization procedure may be iterated by using the improved model as the starting model for finding another search direction, which may then be used to perturb the model in order to better explain the observed data. The process may continue until an improved model is found that satisfactorily explains the observed data. However, if the initial model of an inversion is not in a convex neighborhood of the global minimum, gradient-based optimization methods may tend to converge to an undesired local minimum.

Seismic attenuation (or simply "attenuation") describes the tendency of seismic waves to dissipate and/or disperse when propagating through subsurface regions. Accurate earth models take into account attenuation when estimating the travel time and/or the amplitude of seismic waves. An attenuation quality factor "Q" is typically used to quantitatively describe the effects of attenuation (Wang, 2009). Q decreases in value as the medium becomes more dissipative. Q can be frequency dependent.

Conventional viscoelastic wave equations typically utilize a large number of memory variable components (e.g., 6-times the number of attenuation mechanisms). For example, in models with 3 attenuation mechanisms, conventional viscoelastic wave equations utilize 18-21 memory variable components. Note that similar models that do not account for attenuation may only utilize 6 stress components and 3 velocity components. Therefore, taking attenuation into account in inversion, migration, and/or imaging analysis at least doubles the computation cost. Consequently, attenuation effects are typically ignored in commercial seismic modeling.

The value of any seismic surveying and/or processing in the hydrocarbon industry is closely tied to the time when that result becomes available. A seismic processing result is economically valuable if, and only if, it is available in time to aid a business decision. Typical business decisions that use seismic data and seismic processing results include identifying potential prospective hydrocarbon reservoirs, bidding on a lease, choosing whether or not to engage in a prospect with potential business partners, determining what type of additional data or processing is helpful to ensure safe or efficient operations, locating a well, defining the optimal size of a production facility, and negotiating what size of reserves should be associated with adjacent leases with different owners in an equity determination.

Viscoelastic modeling with 3-D seismic data is computationally intensive and may run (e.g., on a large parallel supercomputer) continuously for several months or even years to reach completion. Any updates during an inversion that do not ensure rock physics stability for the elastic stiffness parameters in combination with the attenuation parameters may cause the simulator to fail. Any interruptions to an automated solution that require human intervention can be very expensive and problematic, and computer resources may be wasted while people do analysis and/or make corrections to restart the process. Such lost resources and time have a direct impact on the value of the inversion result to the business community. Therefore, improving computational efficiencies and/or robustness to enable faster inversion, migration, and/or imaging results may directly impact business decisions and operations.

More efficient equipment and techniques to generate accurate subsurface models would be beneficial.

SUMMARY

Embodiments disclosed herein provide practical and reasonable tradeoffs for selecting attenuation parameters to be used for inversion (e.g., Full Waveform Inversion (FWI)), migration (e.g., Reverse Time Migration (RTM)), and/or imaging therewith. Appropriate attenuation parameters may provide for improved computationally efficiency and accuracy in simulation of viscoelastic wave propagation for a forward simulator and/or an adjoint simulator. Appropriate attenuation parameters may provide for rock physics stability throughout the earth parameter inversion process so long as the corresponding elastic stiffness parameters remain stable. In some embodiments, methods and systems may operate under an assumption of isotropic wave-mode-independent attenuation. Although being less general than heretofore considered, attenuation parameters under such assumption may be fully sufficient to enable convergence of seismic datasets during inversion.

Embodiments disclosed herein may be used to identify features of a subsurface region by seismic simulation, seismic inversion, full waveform inversion, seismic imaging, and/or seismic migration. Embodiments disclosed herein may advance hydrocarbon exploration and/or hydrocarbon management while utilizing an assumption of isotropic wave-mode-independent attenuation for media with arbitrary velocity anisotropy or isotropy. Embodiments disclosed herein may enable stable and/or efficient incorporation of attenuation into seismic methods for understanding hydrocarbon reservoirs.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, particle velocity, and/or acceleration, pressure, reflection, shear, and/or refraction wave data and/or seismic velocity. "Seismic data" is also intended to include any data or properties, including geophysical properties such as one or more of: elastic properties (e.g., P- and/or S-wave velocity, P-Impedance, S-Impedance, density, attenuation, anisotropy, and the like); seismic stacks (e.g., seismic angle stacks); compressional velocity models; and porosity, permeability, or the like, that the ordinarily skilled artisan at the time of this disclosure will recognize may be inferred or otherwise derived from such data received and/or recorded as part of the seismic surveying process. Thus, the disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly includes seismic data, as well as other data obtained from non-seismic geophysical methods such as electrical resistivity.

As used herein, Full Wavefield Inversion (FWI) refers to a geophysical method which is used to estimate subsurface properties (such as velocity or density). FWI is known to be advanced for its higher resolution and more accurate physics compared to conventional methods. The fundamental components of FWI can be described as follows: using a starting subsurface physical properties model, synthetic seismic data are generated by solving a wave equation (e.g., acoustic or elastic wave equation) using a numerical scheme (e.g., finite-difference, finite-element, etc.). The synthetic seismic data are compared with the field seismic data, and, using the differences between the two, the value of an objective function is calculated. To minimize the objective function, a modified subsurface model is generated which is used to simulate a new set of synthetic seismic data. This new set of synthetic seismic data is compared with the field data to recalculate the value of the objective function. An objective function optimization procedure is iterated by using the new improved model as the starting model for finding another search direction, which will then be used to perturb the model in order to better explain the observed data. The process continues until an improved model is found that satisfactorily explains the observed data. A global or local optimization method can be used to minimize the objective function and to update the subsurface model. Commonly used global methods included, but are not limited to, Monte Carlo or grid search. Commonly-used local objective function optimization methods include gradient search, conjugate gradients, quasi Newton, Gauss-Newton and Newton's method. These methods typically utilize gradients of the local objective function with respect to the subsurface parameters. The gradients are often implemented using methods in which both forward equations and adjoint equations (e.g., linear differential equations derived from forward equation using integration by parts and/or particular choices for Lagrange multipliers associated with forward wave equation constraints) are solved (Tromp et al., 2005). For example, viscoelastic wave equations may be used for forward modeling.

The terms "velocity model," "density model," "physical property model," or other similar terms as used herein refer to a numerical representation of parameters for subsurface regions. Generally, the numerical representation includes an array of numbers, typically a 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A geologic model may be represented in volume elements (voxels), in a similar way that a photograph is represented by picture elements (pixels).

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include seismic simulation and/or seismic acquisition design. For example, prior to conducting a seismic survey, a simulation study may be conducted for sensitivity analytics (e.g., to determine whether or not a change in the subsurface rock or fluid properties at a target location will create a detectable change in recorded seismic data). Hydrocarbon management may include business decisions based on seismic simulation and/or seismic acquisition design. For example, business decisions may include whether or not to acquire more seismic data, and/or value rankings of existing and/or proposed datasets.

In complex geological formations, data migration is recognized to be an important technique for imaging seismic data. Data migration comes in two forms, usually called WEM and RTM. In WEM (Wave Equation Migration), energy is back-propagated from the seismic receivers using a one-way wave equation, and forward-propagated from the corresponding seismic source. The wavefields are cross-correlated at image points to create the subsurface image. WEM can produce good images for reflectors with relatively shallow dip angle (the angle between a planar subsurface feature and a horizontal plane). In RTM (Reverse Time Migration), the wavefield at the seismic receivers is back-propagated using a two-way wave equation, and cross-correlated with energy forward-propagated from the source. RTM can produce good images at all reflector dips, but may be more expensive than WEM by a factor typically in the range of 4 to 10.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries. For example, a seismic survey may be conducted to acquire the initial data (noting that these and other embodiments may also or instead include obtaining other geophysical data in addition or, or instead of, seismic data—such as obtaining electrical resistivity measurements). In these and other embodiments, models may be utilized to generate synthetic initial data (e.g., computer simulation). In some embodiments, the initial data may be obtained from a library of data from previous seismic surveys or previous computer simulations. In some embodiments, a combination of any two or more of these methods may be utilized to generate the initial data.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that observed data may be better matched than with conventional techniques, leading to more reliable estimated elastic parameters. For example, unlike the traditional method of generally incorporating attenuation into the wave field propagation equations, assuming isotropic wave-mode-independent attenuation for attenuation parameterization reduces the chance of having an unstable operator in wave field computations. Another potential advantage includes multiple opportunities for savings in computer resources. For example, by utilizing a smaller number of memory variables, the amount of computer memory and/or computational effort/time for computing forward and/or adjoint wave field simulations may be reduced. Likewise, the smaller number of memory variables may reduce the amount of computer storage utilized for "optimal checkpointing" of the forward simulation wavefield. Therefore the performance and efficiency of optimal checkpointing may be improved for inversion, data migration, and/or imaging. (Systems and methods for optimal checkpointing are further discussed in U.S. Pat. No. 8,756,042, which is herein incorporated by reference.) Embodiments of the present disclosure can thereby be useful in the discovery and/or extraction of hydrocarbons from subsurface formations.

Assuming isotropic wave-mode-independent attenuation dictates specific types of earth models. In some embodiments, such earth models may enable estimation and/or representation of anisotropic viscoelastic wave propagation with a reduced set of attenuation parameters compared to models having a general representation of attenuation. For example, homogeneous plane-wave propagation in media with an arbitrary velocity anisotropy, but with isotropic wave-mode-independent attenuation, may be represented by:

$$Q_{ij} = \frac{c_{ij}}{c_{ij}^I}, \quad (1)$$

where $c_{ij}$ and $c_{ij}^I$ are the real and imaginary parts, respectively, of the stiffness coefficient. The quality factor $Q_{ij}$ components in Equation 1 all equal a single Q value, and the real and imaginary parts of the wave vector in the Kelvin Christoffel equation are parallel to each other (Zhu and Tsvankin, 2006; Carcione, 2007). The quasi-P-wave, quasi-S-wave, and inhomogeneous-wave components may all attenuate with a common attenuation operator Q value. This earth model does not provide separate values of $Q_p$ and $Q_s$ for different wave modes, such as a P-wave or an S-wave. Since S-waves typically have more wavelengths to propagate a given distance at a given frequency than P-waves, under this type of earth model, S-waves attenuate more than P-waves over a given distance of propagation. Likewise, with arbitrary velocity anisotropy, attenuation of a given wave mode in a given direction may be dependent upon the number of wavelengths which are included for that wave mode at a given frequency for travel over that distance and direction. Assuming isotropic wave-mode-independent attenuation may serve as a sufficient parameterization for attenuation when the data available are insufficient to define a more detailed attenuation earth model. For isotropic wave-mode-independent attenuation, the attenuation operator can be factored out and applied to the particle velocity components or the particle displacement components, rather than the stress components in velocity-stress simulation equations. Such application of the attenuation operator may be computationally efficient and/or reduce the earth model parameter space for simulation, data migration, imaging, and/or inversion. The isotropic wave-mode-independent attenuation earth model can be applied with a frequency-dependent or frequency-independent single Q for each spatial location in the subsurface earth model in the frequency domain. The isotropic wave-mode-independent attenuation earth model can also, or alternatively, be applied with a frequency-dependent or frequency-independent approximate single Q earth model using memory variables applied to the stress components, the particle velocity components, and/or the particle displacement components in the time domain.

Assuming isotropic wave-mode-independent attenuation transforms the stress equations as follows:

| | General Visco-Elastic Anisotropic Media | Isotropic Wave-Mode-Independent Attenuation Media |
|---|---|---|
| Stress | $\vec{T} = DC\Pi^T \vec{u}$ | $\vec{T} = C\Pi^T D' \vec{u}$ |
| Time Derivative Of Stress | $\frac{\partial \vec{T}}{\partial t} = DC\Pi^T \vec{v}$ | $\frac{\partial \vec{T}}{\partial t} = C\Pi^T D' \vec{v}$ | where D is a 6×6 attenuation operator matrix that operates in the space of the stress vector and D' is a 3×3 attenuation operator matrix that operates in the space of the particle displacement $\vec{u}$ or particle velocity $\vec{v}$. For example, under an assumption of isotropic wave-mode-independent attenuation, the difference between D and D' would be the dimension of the identity matrix. In the simple case where D=I (1+i/Q), where I is the identity matrix, and (1+i/Q) is a complex constant, the I in D would be 6×6, and the I in D' would be 3×3. Π represents a divergence operator in Voigt notation that can be applied to stress or stress rate. $\Pi^T$ represents a gradient operator in Voigt notation that can be applied to particle velocity or particle displacement. C represents the real stiffness matrix.

In some embodiments, inversion (e.g., FWI) and/or imaging (e.g., WEM, RTM, and Least-squares RTM) may be used to model seismic waves propagating in viscoelastic media, thereby exhibiting both elastic properties and attenuation. It should be understood that FWI may be more complex than data migration (e.g., WEM, RTM) or other types of processing for seismic imaging. Therefore, the following discussion may reference FWI, but such techniques and systems may be equally applicable to inversion, data migration, and/or imaging, in general. For example, forward modeling may utilize viscoelastic wave equations as follows (Emmerich and Korn, 1987):

$$\frac{\partial \vec{T}}{\partial t} = C\Pi^T \vec{v} - \sum_{l=1}^{L} \omega_l \vec{r}_l + \vec{S}_T, \quad (2)$$

$$\frac{\partial \vec{r}_l}{\partial t} = -\omega_l \vec{r}_l + (\alpha_l :: C)\Pi^T \vec{v}, \quad (3)$$

$$\rho \frac{\partial \vec{v}}{\partial t} = \Pi \vec{T} + \vec{S}_v, \quad (4)$$

where:

$\vec{T} = (T_{xx}\ T_{yy}\ T_{zz}\ T_{yz}\ T_{xz}\ T_{xy})^T$ is the stress vector,
$\vec{v} = (v_x\ v_y\ v_z)^T$ is the velocity vector, C is the 6×6 stiffness matrix representing the medium properties, L represents the number of modeled attenuation mechanisms (e.g., 3), $$\Pi = \begin{pmatrix} \frac{\partial}{\partial x} & 0 & 0 & 0 & \frac{\partial}{\partial z} & \frac{\partial}{\partial y} \\ 0 & \frac{\partial}{\partial y} & 0 & \frac{\partial}{\partial z} & 0 & \frac{\partial}{\partial x} \\ 0 & 0 & \frac{\partial}{\partial z} & \frac{\partial}{\partial y} & \frac{\partial}{\partial x} & 0 \end{pmatrix}$$

is a matrix composed of spatial derivatives,

ρ is the density, $\omega_l$ is the $l^{th}$ relaxation frequency and l=1, 2, . . . , L, $\vec{r}_l = (r_{xx}^l \ r_{yy}^l \ r_{zz}^l \ r_{yz}^l \ r_{xz}^l \ r_{xy}^l)^T$ is the $l^{th}$ memory variable vector, $\alpha_l$ is a 6×6 matrix representing the $l^{th}$ relaxation modulus (typically assumed to be zero when not accounting for attenuation), $\alpha_l$::C is the element-wise product between two matrices $\alpha_l$ and C.

$\vec{S}_T$ is the stress source, and $\vec{S}_v$ is the velocity source.

The complex stiffness matrix suitable for frequency domain simulation may be replaced by parameters for memory variables and relaxation moduli to enable efficient time-domain simulation. To account for attenuation, the relaxation frequencies $\omega_l$ and moduli $\alpha_l$ may be computed using a Generalized-Maxwell rheological model for a given attenuation quality factor matrix Q (Moczo and Kristek, 2005). For example, the multiplicative inverse of the attenuation quality factor is implicitly defined in the frequency domain ω as:

$$Q_{IJ}^{-1}(\omega) = \sum_{l=1}^{L} \alpha_{IJ}^l \frac{\omega_l \omega + \omega_l^2 Q_{IJ}^{-1}(\omega)}{\omega_l^2 + \omega^2}, \quad (5)$$

where $Q_{IJ}$ and $\alpha_{IJ}^l$ are the $IJ^{th}$ element of the matrices Q and $\alpha_l$, respectively. For a given frequency band, Equation 5 establishes a one-to-one relationship between quality factor $Q_{IJ}$ and relaxation modulus $\alpha_{IJ}^l$. In the time domain, Equation 3 with $\alpha_{IJ}^l$ fully describes the dissipation and dispersion nature of attenuation. Therefore, relaxation modulus $\alpha_{IJ}^l$ may be used for an attenuation-related material property instead of quality factor $Q_{IJ}$.

Since there are multiple attenuation mechanisms (L memory variable components) associated with each stress component, computational costs (e.g., time, resources, etc.) significantly increase when attenuation is included in FWI based on Equations 2-5. Therefore, in some embodiments, wave equations under an assumption of isotropic wave-mode-independent attenuation may be used to model seismic waves propagating in viscoelastic media. For example, viscoelastic FWI may utilize wave equations under an assumption of isotropic wave-mode-independent attenuation to reduce specific parameters and overall computational costs. In one type of wave equations under an assumption of isotropic wave-mode-independent attenuation, referred to as "velocity-attenuation" equations, attenuation mechanisms may be reflected in the particle velocity vector (having only 3 components) rather than in the stress vector (having 6 components). The velocity-attenuation forward wave equations may be expressed as follows:

$$\rho \frac{\partial \vec{v}}{\partial t} = \Pi \vec{\sigma} - \sum_{l=1}^{L} \omega_l \vec{m}_l + \vec{S}_v, \quad (6)$$

$$\frac{\partial \vec{\sigma}}{\partial t} = C \Pi^T \vec{v} + \vec{S}_\sigma, \quad (7)$$

$$\frac{\partial \vec{m}_l}{\partial t} = -\omega_l \vec{m}_l + (\alpha_l^T \Pi^T)^T \vec{\sigma}, \quad (8)$$

where $\vec{\sigma} = (\sigma_{xx} \ \sigma_{yy} \ \sigma_{zz} \ \sigma_{yz} \ \sigma_{xz} \ \sigma_{xy})^T$ is the newly-defined stress vector, $\vec{m}_l = (m_x^l \ m_y^l \ m_z^l)^T$ is the $l^{th}$ newly-defined memory variable vector, and $\vec{S}_\sigma$ is the source of the newly-defined stress.

These velocity-attenuation forward wave equations (Equations 6-8) contain only 3 L memory variable components, compared with 6 L memory variable components in Equations 2-5. Consequently, velocity-attenuation equations reduce the number of variables from 18 to 9, leading to significant savings in computation cost. Moreover, by simplifying the attenuation quality factor matrix Q, the velocity-attenuation equations may be more likely to produce a unique and/or well-constrained solution.

It is currently believed that the missing factors (factors present in prior viscoelastic wave equations but missing from velocity-attenuation equations) are not critical for seismic interpretation of geologic formations. While the difference between $Q_p$ and $Q_s$ may be theoretically useful for predicting fluid content, in practice, the industry has not been able to reliably find individual $Q_p$ and $Q_s$ for accurate commercial fluid content prediction. The spatial resolution of attenuation parameters is typically less well-defined than for the corresponding elastic stiffness parameters. Therefore, in a practical application, fewer attenuation parameters than elastic parameters may be used. The missing factors, however, may be more important for fitting data to gas pockets.

The velocity-attenuation adjoint wave equations (adjoints of Equations 6-8) may be expressed as follows:

$$\frac{\partial \vec{\overline{\sigma}}}{\partial t} = \Pi^T \left(\frac{1}{\rho} \vec{\overline{v}}\right) - \sum_{l=1}^{L} \alpha_l \Pi^T \vec{\overline{m}}_l + \frac{\partial F}{\partial \vec{\sigma}}, \quad (9)$$

$$\frac{\partial \vec{\overline{v}}}{\partial t} = \Pi C \vec{\overline{\sigma}} + \frac{\partial F}{\partial \vec{v}}, \quad (10)$$

$$\frac{\partial \vec{\overline{m}}_l}{\partial t} = -\left(\frac{1}{\rho} \omega_l \vec{\overline{v}} + \omega_l \vec{\overline{m}}_l\right), \quad (11)$$

where $\vec{\overline{\sigma}} = (\overline{\sigma}_{xx} \ \overline{\sigma}_{yy} \ \overline{\sigma}_{zz} \ \overline{\sigma}_{yz} \ \overline{\sigma}_{xz} \ \overline{\sigma}_{xy})^T$ is the adjoint stress vector, $\vec{\overline{v}} = (\overline{v}_x \ \overline{v}_y \ \overline{v}_z)^T$ is the adjoint velocity vector, $\vec{\overline{m}}_l = (\overline{m}_x^l \ \overline{m}_y^l \ \overline{m}_z^l)^T$ is the $l^{th}$ adjoint memory variable vector, and F is the objective function for FWI.

The velocity-attenuation gradients of the objective function F with respect to the medium properties may be expressed as follows:

$$\frac{\partial F}{\partial C} = \int_0^T \vec{\sigma}(\Pi^T \vec{v})^T dt, \qquad (12)$$

$$\frac{\partial F}{\partial \rho} = \int_0^T -\left\langle \frac{1}{\rho^2} \vec{v}, \Pi \vec{\sigma} - \sum_{l=1}^L \omega_l \vec{m}_l \right\rangle dt, \qquad (13)$$

$$\frac{\partial F}{\partial \alpha_l} = -\int_0^T \vec{\sigma}(\Pi^T \vec{m}_l)^T dt, \qquad (14)$$

where $\langle , \rangle$ denotes the inner product between two vectors.

Figure 1:
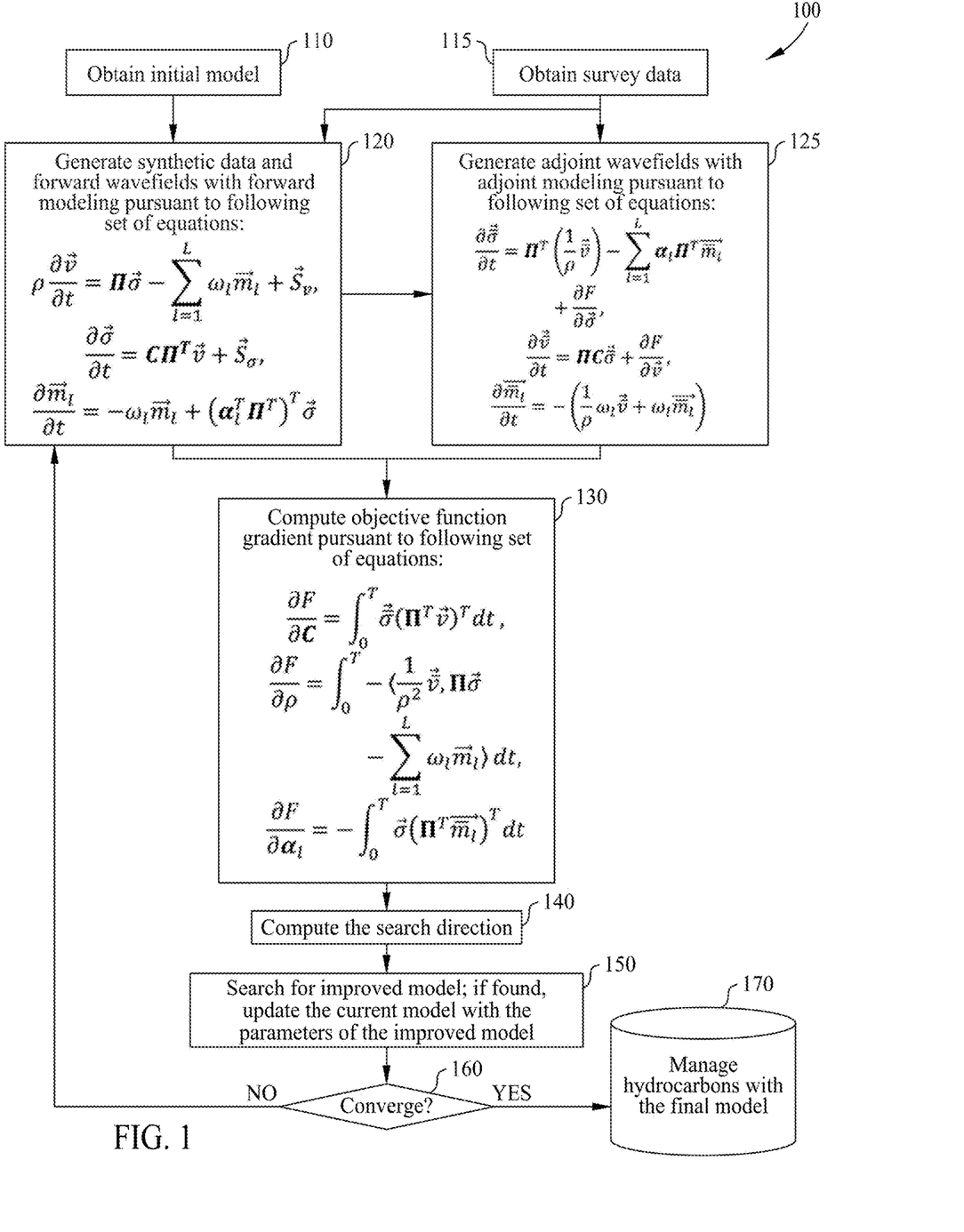
FIG. 1 illustrates an exemplary method for viscoelastic inversion under an assumption of isotropic wave-mode-independent attenuation.

FIG. 1 illustrates an exemplary method 100 for a viscoelastic FWI under an assumption of isotropic wave-mode-independent attenuation. For example, viscoelastic FWI may utilize wave equations under an assumption of isotropic wave-mode-independent attenuation (e.g., the above-disclosed velocity-attenuation equations). Method 100 begins by obtaining an initial subsurface physical property model at block 110 and by obtaining survey data (e.g., survey geometry, source wavelet information) at block 115. The actions of blocks 110 and 115 may occur in parallel, sequentially, and/or in any order. The initial model may include one or more subsurface properties as a function of location in a subsurface region. In some embodiments, one of the subsurface properties may be arbitrary velocity anisotropy through a portion or all of the subsurface region. In some embodiments, a seismic survey of the subsurface region may be conducted to acquire the survey data (noting that these and other embodiments may also or instead include obtaining other geophysical data in addition or, or instead of, seismic data—such as obtaining electrical resistivity measurements). In these and other embodiments, models may be utilized to generate synthetic survey data (e.g., computer simulation). In some embodiments, the survey data may be obtained from a library of data from previous seismic surveys of the subsurface region or previous computer simulations. In some embodiments, a combination of any two or more of these methods may be utilized to generate the survey data.

Method 100 continues at block 120 where synthetic data and forward wavefields are generated by forward wavefield modeling with wave equations under an assumption of isotropic wave-mode-independent attenuation. For example, the forward modeling may use velocity-attenuation forward wave equations (Equations 6-8), the initial model (e.g., an initial earth model) from block 110, and the survey data from block 115.

Method 100 continues at block 125 where adjoint wavefields are generated by adjoint wavefield modeling with wave equations under an assumption of isotropic wave-mode-independent attenuation. For example, the adjoint modeling may use velocity-attenuation adjoint wave equations (Equations 9-11) with the generated synthetic data and any models associated therewith (from block 120) and the survey data (from block 115).

Method 100 continues at block 130 where the velocity-attenuation gradients of the objective function with respect to the inversion parameters is computed. For example, the velocity-attenuation gradients may be computed using the velocity-attenuation gradients (Equations 12-14), the forward wavefields (from block 120), and the adjoint wavefields (from block 125).

Method 100 continues at block 140 where the search direction is computed using an optimization algorithm (e.g., a conjugate gradient algorithm).

Method 100 continues at block 150 where an improved model is sought. For example, the current model (e.g., the initial model from block 110) may be perturbed in the search direction (from block 140). The perturbed model may be compared with the current model to determine which better explains and/or more closely matches the measured data (from block 115). For example, the model that gives the smallest objective function value may be chosen to be the improved model. Once an improved model is identified, the current model may be updated with the parameters of the improved model.

Method 100 continues at block 160 where the models are checked for convergence. For example, a predetermined threshold for convergence between measured data (of block 115) and the synthetic data (from block 120) may be set. When convergence is not satisfied at block 160, method 100 may continue with one or more subsequent iterations of blocks 120-160. For example, in subsequent iterations, forward modeling at block 120 may use the velocity-attenuation forward wave equations, an updated model from block 160 of the preceding iteration, and the survey data from block 115.

Once convergence has been satisfied at block 160, method 100 may terminate. For example, method 100 may terminate at block 170 where the final model (from block 150) may be used to manage hydrocarbons.

Figure 2:
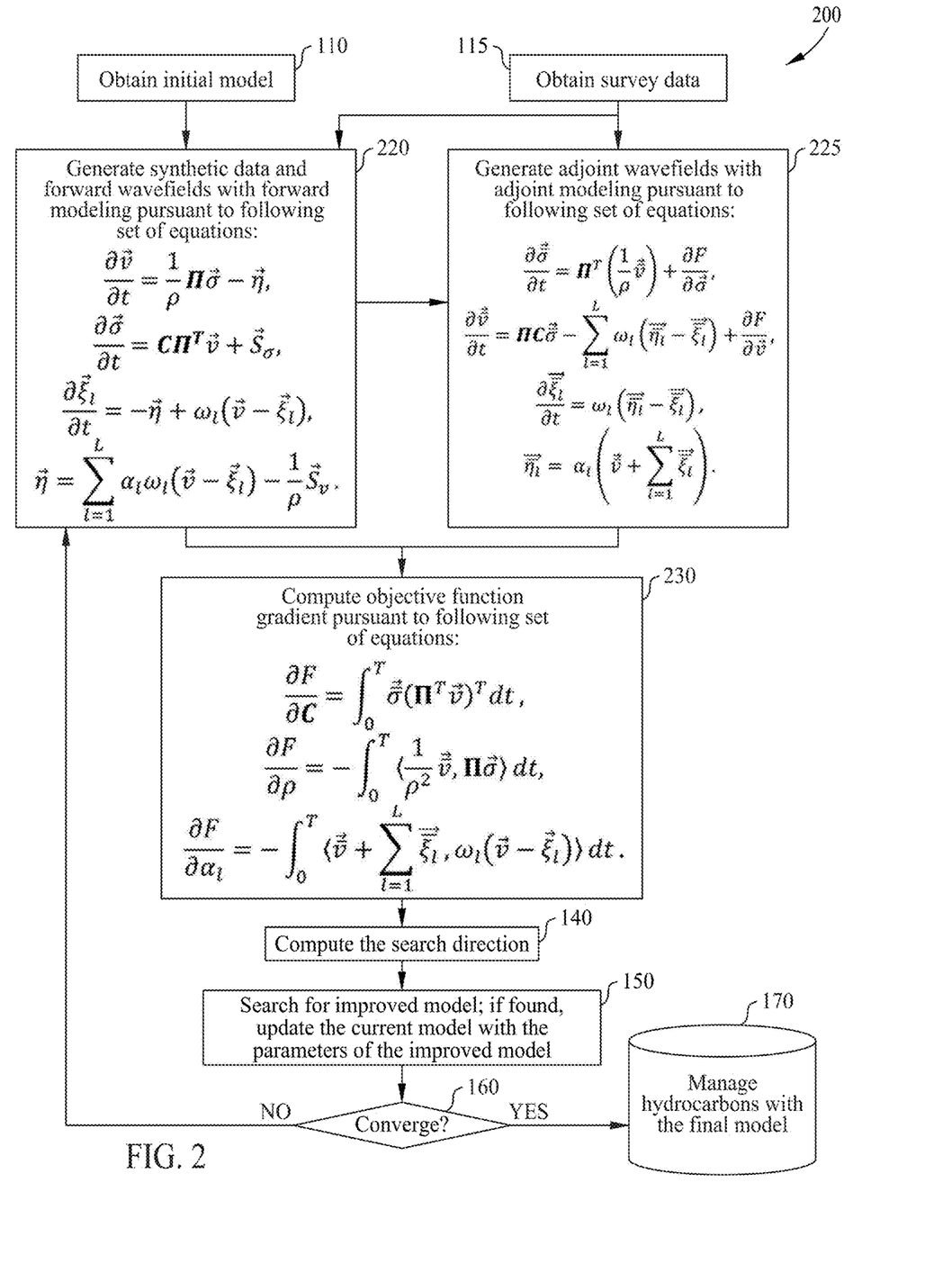
FIG. 2 illustrates another exemplary method for viscoelastic inversion under an assumption of isotropic wave-mode-independent attenuation.

FIG. 2 illustrates another exemplary method 200 for viscoelastic FWI under an assumption of isotropic wave-mode-independent attenuation. For example, method 200 may utilize viscoelastic FWI with wave equations under an assumption of isotropic wave-mode-independent attenuation. Unlike method 100, method 200 defines a new auxiliary variable that is a function of velocity and the memory variables. For example, the auxiliary variable vector may be expressed as follows:

$$\vec{\xi}_l = \vec{v} - \frac{1}{\rho} \alpha_l^{-1} \vec{m}_l, \qquad (15)$$

where l=1, ..., L. Note that the auxiliary variable vector associated with the velocity vector is different from the auxiliary variable vector associated with the stress vector introduced by Denli and Kanevsky (2014).

Similar to method 100, method 200 begins by obtaining an initial subsurface physical property model at block 110 and by obtaining survey data at block 115. The actions of blocks 110 and 115 may occur in parallel, sequentially, and/or in any order.

Similar to method 100, method 200 continues at block 220 where synthetic data and forward wavefields are generated by forward wavefield modeling. However, method 200 substitutes the new auxiliary variable $\vec{\xi}_l$ into prior Equations 6-8. Therefore, another type of wave equations under an assumption of isotropic wave-mode-independent attenuation may be referred to as "auxiliary velocity-attenuation" equations. The resulting auxiliary velocity-attenuation forward wave equations may be expressed as follows:

$$\frac{\partial \vec{v}}{\partial t} = \frac{1}{\rho} \Pi \vec{\sigma} - \vec{\eta}, \qquad (16)$$

$$\frac{\partial \vec{\sigma}}{\partial t} = C\Pi^T \vec{v} + \vec{S}_\sigma, \quad (17)$$

$$\frac{\partial \vec{\xi}_l}{\partial t} = -\vec{\eta} + \omega_l(\vec{v} - \vec{\xi}_l), \quad (18)$$

$$\vec{\eta} = \sum_{l=1}^{L} \alpha_l \omega_l (\vec{v} - \vec{\xi}_l) - \frac{1}{\rho} \vec{S}_v, \quad (19)$$

where $\vec{\eta}$ is a new variable defined for clarity.

Similar to method 100, method 200 continues at block 225 where adjoint wavefields are generated by adjoint wavefield modeling. However, for method 200, the auxiliary velocity-attenuation adjoint wave equations may be expressed as follows:

$$\frac{\partial \vec{\sigma}}{\partial t} = \Pi^T \left(\frac{1}{\rho} \vec{v}\right) + \frac{\partial F}{\partial \vec{\sigma}}, \quad (20)$$

$$\frac{\partial \vec{v}}{\partial t} = \Pi C \vec{\sigma} - \sum_{l=1}^{L} \omega_l (\vec{\eta}_l - \vec{\xi}_l) + \frac{\partial F}{\partial \vec{v}}, \quad (21)$$

$$\frac{\partial \vec{\xi}_l}{\partial t} = \omega_l (\vec{\eta}_l - \vec{\xi}_l), \quad (22)$$

$$\vec{\eta}_l = \alpha_l \left(\vec{v} + \sum_{l=1}^{L} \vec{\xi}_l\right). \quad (23)$$

Note that the auxiliary variable causes spatial derivatives of the memory variables to drop out of the adjoint equations, which may lead to additional saving of computation resources.

Similar to method 100, method 200 continues at block 230 where the gradient of the objective function with respect to the inversion parameters is computed. However, for method 200, auxiliary velocity-attenuation gradients of the objective function F with respect to the medium properties may be expressed as follows:

$$\frac{\partial F}{\partial C} = \int_0^T \vec{\sigma}(\Pi^T \vec{v})^T dt, \quad (24)$$

$$\frac{\partial F}{\partial \rho} = -\int_0^T \left\langle \frac{1}{\rho^2} \vec{v}, \Pi \vec{\sigma} \right\rangle dt, \quad (25)$$

$$\frac{\partial F}{\partial \alpha_l} = -\int_0^T \left\langle \vec{v} + \sum_{l=1}^{L} \vec{\xi}_l, \omega_l(\vec{v} - \vec{\xi}_l) \right\rangle dt. \quad (26)$$

The remainder of method 200 proceeds quite similarly to method 100. Note that the adjoint Equation 20 contains fewer of the spatial-derivative operators $\Pi^T$ than the adjoint Equation 10. Therefore, the computation cost of method 200 is even furthered reduced.

Viscoelastic FWI with an assumption of isotropic wave-mode-independent attenuation wave equations may be beneficial for a variety of hydrocarbon management tasks. For example, accurately imaging a subsurface formation that includes a reflector below a gas pocket may be otherwise difficult or impossible due to computational complexity. It is currently believed that FWI using viscoelastic wave Equations 2-4 may take 10 million node-hours, that similar FWI according to method 100 may take 6 million node-hours, and that similar FWI according to method 200 may take 4 million node-hours. For example, a 5000-node high-performance computer may achieve 10 million node-hours in approximately 83 days. Method 200 may reduce the computing time to approximately 33 days with the same computer.

In some embodiments, and at time to time during method 100 and/or method 200, checkpoints may be established and/or referenced. For example, to decrease the storage utilized during method 100 and/or method 200, one or more checkpoints may be defined. Such checkpoints may be utilized to perform a cross-correlation, to restart a forward simulation from a given time step, and/or to access forward simulation wavefield states in reverse-time order. Checkpoints may be saved at a smaller number of carefully chosen time steps so that the forward simulation can be restarted from the saved checkpoints and/or propagated to desired time steps. Thus, the forward simulation can be recomputed at time steps in reverse time order as desired starting from the saved checkpoints. The checkpoint memory may be refreshed and/or reused for new checkpoints. A suitable checkpoint may include, for example, a forward simulation wavefield state, including much or all of the information utilized to perform a cross-correlation, to restart a forward simulation from a given time step, and/or to access forward simulation wavefield states in reverse-time order. In some embodiments, the checkpoint may be established and/or referenced as "optimal checkpointing" for a specified amount of memory. The performance and efficiency of optimal checkpointing may be improved for inversion, data migration, and/or imaging when memory checkpointing specifications are reduced under the assumption of isotropic wave-mode-independent attenuation.

Figure 3A:
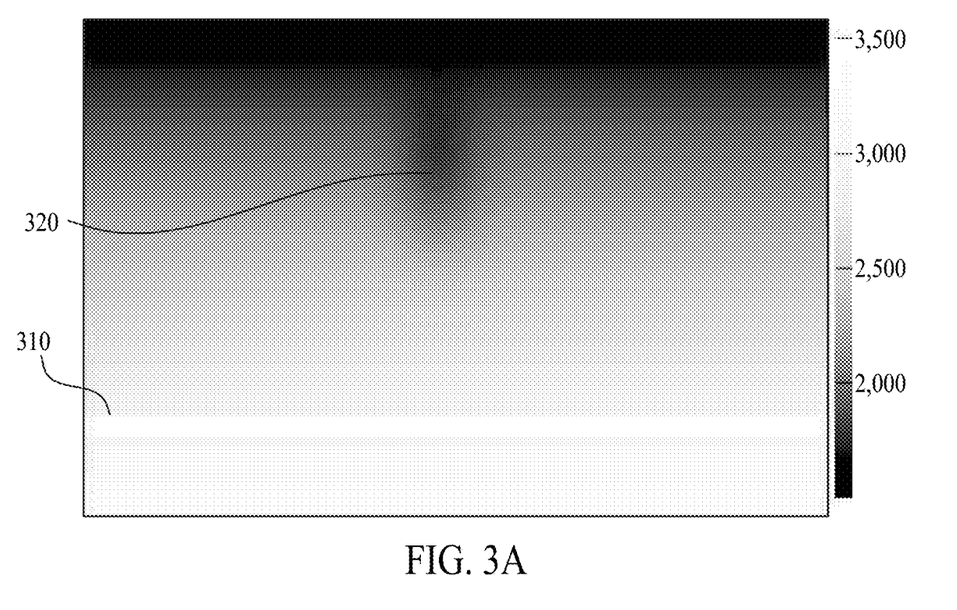
FIG. 3A illustrates a P-wave velocity model of a subsurface formation that includes a reflector below a gas pocket.
Figure 3B:
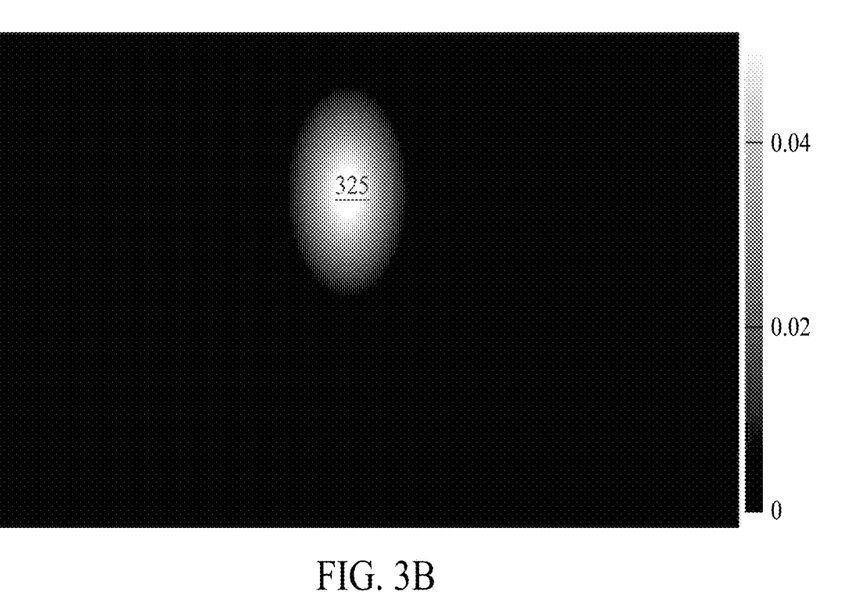
FIG. 3B illustrates the attenuation of the modeled subsurface formation of FIG. 3A.

FIG. 3A illustrates a P-wave velocity model of a subsurface formation that includes a reflector below a gas pocket. Horizontal reflector 310 can be seen below oval-shaped gas pocket 320. FIG. 3B illustrates the attenuation (displayed as 1/Q) of the modeled subsurface formation of FIG. 3A. Note the region 325 of very high attenuation that is indicative of the gas pocket 320.

Figure 4A:
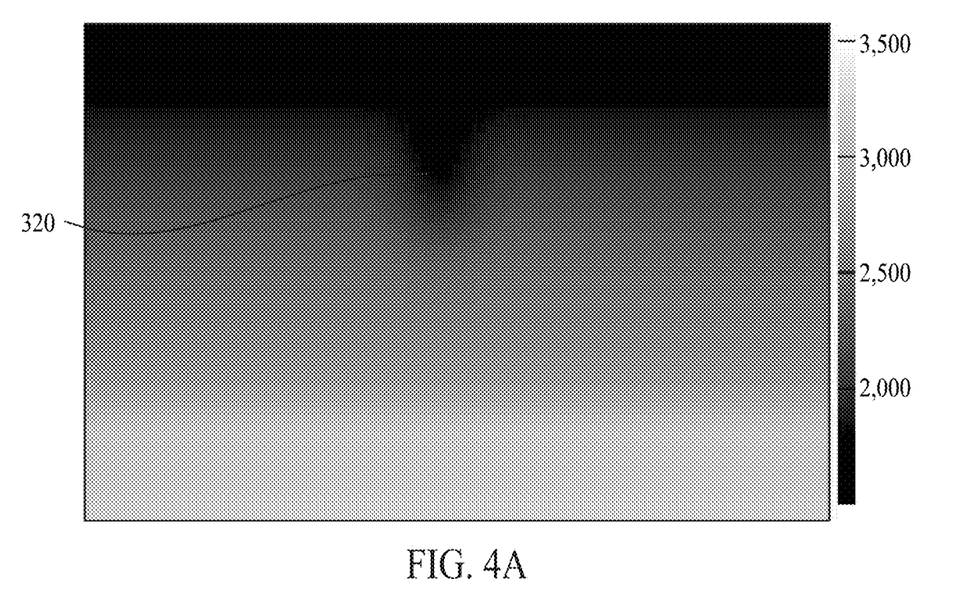
FIG. 4A illustrates an initial P-wave velocity model for the modeled subsurface formation of FIG. 3A.
Figure 4B:
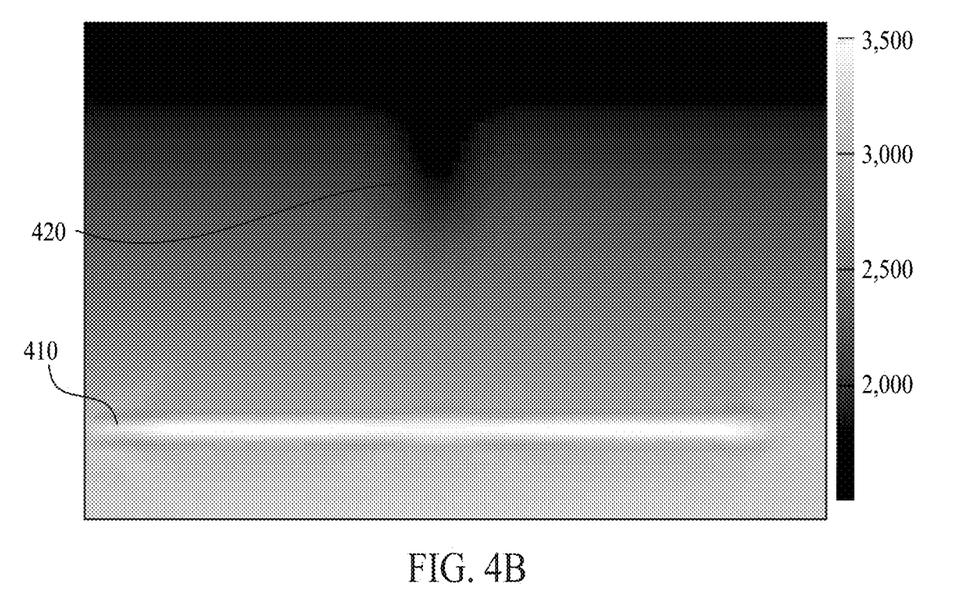
FIG. 4B illustrates an inverted P-wave velocity model based on the initial model of FIG. 4A.

In this example, viscoelastic FWI with an assumption of isotropic wave-mode-independent attenuation wave equations is applied to image the subsurface formation represented by FIGS. 3A-3B. For example, according to method 200, viscoelastic FWI with an assumption of isotropic wave-mode-independent attenuation wave equations begins (at block 110) with obtaining an initial P-wave velocity model, as illustrated in FIG. 4A. Note that the initial P-wave velocity model includes the gas pocket 320. However, the initial P-wave model does not include reflector 310. Method 200 also begins (at block 110) with obtaining an initial model for attenuation quality factor Q, which, in this example, can be derived from FIG. 3B. Method 200 also begins (at block 115) with obtaining survey data. In this example, the models of FIG. 3A-3B may be used to simulate survey data that mimics measured survey data. Method 200 may then proceed to generate the inverted P-wave velocity model of FIG. 4B. Note in the inversion image (FIG. 4B) that a fast velocity layer 410 accurately reconstructs reflector 310 from FIG. 3A.

In practical applications, the present technological advancement may be used in conjunction with a seismic data analysis system (e.g., a high-speed computer) programmed in accordance with the disclosures herein. Preferably, in order to efficiently perform FWI, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 5:
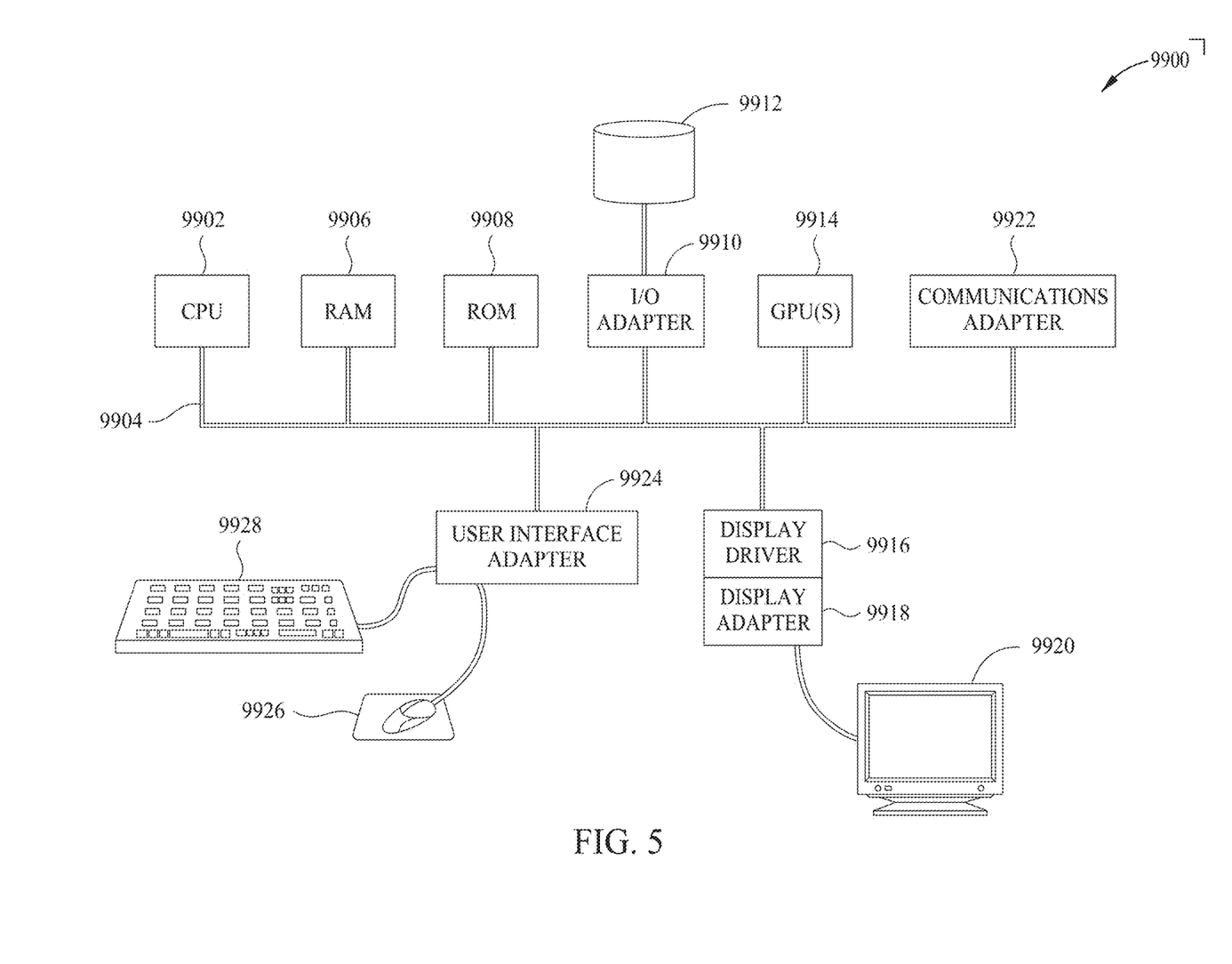
FIG. 5 illustrates a block diagram of a seismic data analysis system upon which the present technological advancement may be embodied.

FIG. 5 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 5, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein. As the models themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

The above-described techniques, and/or systems implementing such techniques, can further include hydrocarbon management based at least in part upon the above techniques. For instance, methods according to various embodiments may include managing hydrocarbons based at least in part upon models and/or images constructed according to the above-described methods. In particular, such methods may include drilling a well, and/or causing a well to be drilled, based at least in part upon the resultant models and/or images (e.g., such that the well is located based at least in part upon a location determined from the resultant models and/or images, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The following references are incorporated by reference in their entirety:

Carcione, J., 2015. Wave Fields in Real Media (Third Edition) Wave Propagation in Anisotropic, Anelastic, Porous and Electromagnetic Media, Elsevier.

Denli, H. and Kanevsky, A., 2015. Fast Viscoacoustic and Viscoelastic Full Wavefield Inversion. United States Patent US2015/0362622A1.

Emmerich, H. and Korn, M., 1987. Incorporation of attenuation into time-domain computations of seismic wave fields. Geophysics, 52(9), pp. 1252-1264.

Moczo, P. and Kristek, J., 2005. On the rheological models used for time-domain methods of seismic wave propagation. Geophysical Research Letters, 32(1).

Tromp, J., Tape, C. and Liu, Q., 2005. Seismic tomography, adjoint methods, time reversal and banana-doughnut kernels. Geophysical Journal International, 160(1), pp. 195-216.

Wang, Y., 2009. Seismic inverse Q filtering. John Wiley & Sons.

Zhu, Y. and Tsvankin, I., 2006. Plane-wave propagation in attenuative transversely isotropic media. Geophysics, 71(2), pp. T17-T30.

The invention claimed is:

1. A method for identifying features of a subsurface region, comprising:
    obtaining an initial physical property model and survey data for the subsurface region;
    identifying a current model to be the initial physical property model; and
    executing one or more iterations of:
        generating synthetic data and forward wavefields with the current model and the survey data by forward modeling with forward wave equations representing isotropic wave-mode-independent attenuation;
        generating adjoint wavefields with the synthetic data and the survey data by adjoint modeling with adjoint wave equations representing isotropic wave-mode-independent attenuation;
        computing an objective function gradient with the forward wavefields and the adjoint wavefields by solving gradient equations associated with the corresponding wave equations representing isotropic wave-mode-independent attenuation;
        computing a search direction of the objective function;
        searching for a possible improved model along the search direction;
        if the possible improved model more closely matches the survey data than the current model, updating the current model to be the possible improved model; and
        if a difference between the synthetic data and the survey data has not converged, executing another iteration; and
    after the difference between the synthetic data and the survey data has converged:
        identify a final model to be the last current model; and
        generate an image of the subsurface region based on features of the final model.

2. The method of claim 1, further comprising generating an image of the subsurface region with at least one of the current model and the possible improved model.

3. The method of claim 2, wherein executing one or more iterations comprises at least one of Wave Equation Migration (WEM) and Reverse Time Migration (RTM).

4. The method of claim 1, wherein at least two iterations are executed.

5. The method of claim 4, wherein executing one or more iterations comprises at least one of Full Wavefield Inversion (FWI) and Least-Squares Reverse Time Migration (LSRTM).

6. The method of claim 1, wherein the initial physical property model comprises a property representing arbitrary velocity anisotropy throughout at least a portion of the subsurface region.

7. The method of claim 1, further comprising, after the difference between the synthetic data and the survey data has converged:
    identifying a final model to be the last current model; and
    managing hydrocarbons in the subsurface region based on features of the final model.

8. The method of claim 1, wherein:
    the forward wave equations comprise velocity-attenuation forward wave equations,
    the adjoint wave equations comprise velocity-attenuation adjoint wave equations, and
    the gradient equations comprise velocity-attenuation gradient equations.

9. The method of claim 8, wherein:
    the velocity-attenuation forward wave equations comprise:

$$\rho \frac{\partial \vec{v}}{\partial t} = \Pi \vec{\sigma} - \sum_{l=1}^{L} \omega_l \vec{m}_l + \vec{S}_v,$$

$$\frac{\partial \vec{\sigma}}{\partial t} = C\Pi^T \vec{v} + \vec{S}_\sigma, \text{ and}$$

$$\frac{\partial \vec{m}_l}{\partial t} = -\omega_l \vec{m}_l + (a_l^T \Pi^T)^T \vec{\sigma},$$

where
$\vec{\sigma} = (\sigma_{xx} \; \sigma_{yy} \; \sigma_{zz} \; \sigma_{yz} \; \sigma_{xz} \; \sigma_{xy})^T$ is a stress vector,
$\vec{v} = (v_x \; v_y \; v_z)^T$ is a velocity vector,
C is a stiffness matrix representing the medium properties,
L represents a number of modeled attenuation mechanisms,
$\pi$ a matrix of spatial derivatives,
$\rho$ is density,
$\omega_l$ is an $l^{th}$ relaxation frequency and l=1, 2, . . . , L,
$\alpha_l$ is a matrix representing the $l^{th}$ relaxation modulus,
$\vec{m}_l = (m_x^l \; m_y^l \; m_z^l)^T$ is a memory variable vector, and
$\vec{S}_\sigma$ is a source of the stress vector;
the velocity-attenuation adjoint wave equations comprise:

$$\frac{\partial \vec{\overline{\sigma}}}{\partial t} = \Pi^T \left(\frac{1}{\rho} \vec{\overline{v}}\right) - \sum_{l=1}^{L} \alpha_l \Pi^T \vec{\overline{m}}_l + \frac{\partial F}{\partial \vec{\sigma}},$$

$$\frac{\partial \vec{\overline{v}}}{\partial t} = \Pi C \vec{\overline{\sigma}} + \frac{\partial F}{\partial \vec{v}}, \text{ and}$$

$$\frac{\partial \vec{\overline{m}}_l}{\partial t} = -\left(\frac{1}{\rho} \omega_l \vec{\overline{v}} + \omega_l \vec{\overline{m}}_l\right),$$

where
$\vec{\overline{\sigma}} = (\overline{\sigma}_{xx} \; \overline{\sigma}_{yy} \; \overline{\sigma}_{zz} \; \overline{\sigma}_{yz} \; \overline{\sigma}_{xz} \; \overline{\sigma}_{xy})^T$ is an adjoint stress vector,
$\vec{\overline{v}} (\overline{v}_x \; \overline{v}_y \; \overline{v}_z)^T$ is an adjoint velocity vector,
$\vec{\overline{m}}_l = (\overline{m}_x^l \; \overline{m}_y^l \; \overline{m}_z^l)^T$ is an adjoint memory variable vector, and
F is an objective function; and
the velocity-attenuation gradient equations comprise:

$$\frac{\partial F}{\partial C} = \int_0^T \vec{\overline{\sigma}} (\Pi^T \vec{v})^T dt,$$

$$\frac{\partial F}{\partial \rho} = \int_0^T -\left\langle \frac{1}{\rho^2} \vec{\overline{v}}, \Pi \vec{\sigma} - \sum_{l=1}^{L} \omega_l \vec{m}_l \right\rangle dt, \text{ and}$$

$$\frac{\partial F}{\partial \alpha_l} = -\int_0^T \vec{\overline{\sigma}} (\Pi^T \vec{m}_l)^T dt.$$

10. The method of claim 1, wherein:
    the forward wave equations comprise auxiliary velocity-attenuation forward wave equations,
    the adjoint wave equations comprise auxiliary velocity-attenuation adjoint wave equations, and the gradient equations comprise auxiliary velocity-attenuation gradient equations.

11. The method of claim 10, wherein:
the auxiliary velocity-attenuation forward wave equations comprise:

$$\frac{\partial \vec{v}}{\partial t} = \frac{1}{\rho}\Pi\vec{\sigma} - \vec{\eta},$$

$$\frac{\partial \vec{\sigma}}{\partial t} = C\Pi^T \vec{v} + \vec{S}_\sigma,$$

$$\frac{\partial \vec{\xi}_l}{\partial t} = -\vec{\eta} + \omega_l(\vec{v} - \vec{\xi}_l), \text{ and}$$

$$\vec{\eta} = \sum_{l=1}^{L} \alpha_l \omega_l(\vec{v} - \vec{\xi}_l) - \frac{1}{\rho}\vec{S}_v;$$

where,
$\vec{\sigma} = (\sigma_{xx}\ \sigma_{yy}\ \sigma_{zz}\ \sigma_{yz}\ \sigma_{xz}\ \sigma_{xy})^T$ is a stress vector,
$\vec{v} = (v_x\ v_y\ v_z)^T$ is a velocity vector,
C is a stiffness matrix representing the medium properties,
L represents a number of modeled attenuation mechanisms,
$\pi$ a matrix of spatial derivatives,
p is density,
$\omega_l$ is an $l^{th}$ relaxation frequency and $l=1, 2, \ldots, L$,
$\alpha_l$ is a matrix representing the $l^{th}$ relaxation modulus,
$\vec{S}_\sigma$ is a source of the stress vector;

$$\vec{\xi}_l = \vec{v} - \frac{1}{\rho}\alpha_l^{-1}\vec{m}_l.$$

is an $l^{th}$ auxiliary variable vector, and
the auxiliary velocity-attenuation adjoint wave equations comprise:

$$\frac{\partial \vec{\overline{\sigma}}}{\partial t} = \Pi^T\left(\frac{1}{\rho}\vec{\overline{v}}\right) + \frac{\partial F}{\partial \vec{\sigma}},$$

$$\frac{\partial \vec{\overline{v}}}{\partial t} = \Pi C\vec{\overline{\sigma}} - \sum_{l=1}^{L} \omega_l(\vec{\overline{\eta}}_l - \vec{\overline{\xi}}_l) + \frac{\partial F}{\partial \vec{v}},$$

$$\frac{\partial \vec{\overline{\xi}}_l}{\partial t} = \omega_l(\vec{\overline{\eta}}_l - \vec{\overline{\xi}}_l), \text{ and}$$

$$\vec{\overline{\eta}}_l = \alpha_l\left(\vec{\overline{v}} + \sum_{l=1}^{L} \vec{\overline{\xi}}_l\right);$$

and
where
$\vec{\overline{\sigma}} = (\overline{\sigma}_{xx}\ \overline{\sigma}_{yy}\ \overline{\sigma}_{zz}\ \overline{\sigma}_{yz}\ \overline{\sigma}_{xz}\ \overline{\sigma}_{xy})^T$ is an adjoint stress vector,
$\vec{\overline{v}} = (\overline{v}_x\ \overline{v}_y\ \overline{v}_z)^T$ is an adjoint velocity vector,
$\vec{\overline{\xi}}_l$ is the $l^{th}$ adjoint auxiliary variable vector, and
F is an objective function for Full Wavefield Inversion (FWI), and
the auxiliary velocity-attenuation gradient equations comprise:

$$\frac{\partial F}{\partial C} = \int_0^T \vec{\overline{\sigma}}(\Pi^T\vec{v})^T dt,$$

$$\frac{\partial F}{\partial \rho} = -\int_0^T \left\langle \frac{1}{\rho^2}\vec{\overline{v}}, \Pi\vec{\sigma}\right\rangle dt, \text{ and}$$

$$\frac{\partial F}{\partial \alpha_l} = -\int_0^T \left\langle \vec{\overline{v}} + \sum_{l=1}^{L} \vec{\overline{\xi}}_l, \omega_l(\vec{v} - \vec{\xi}_l)\right\rangle dt.$$

12. The method of claim 1, wherein the forward wave equations are based on an auxiliary variable that is a function of velocity and a memory variable.

13. The method of claim 12, further comprising using the auxiliary variable to cause spatial derivatives of memory variables to drop out of the adjoint wave equations.

14. The method of claim 1, further comprising:
defining one or more checkpoints comprising a forward simulation wavefield state; and
utilizing the one or more checkpoints to perform a cross-correlation.

15. The method of claim 1, further comprising:
defining a plurality checkpoints, each comprising a forward simulation wavefield state; and
utilizing the plurality of checkpoints to access the respective forward simulation wavefield states in time-reverse order.

16. The method of claim 1, wherein the forward modeling is implemented in the time domain using memory variables.

17. The method of claim 1, wherein the forward modeling is implemented in the frequency domain.

18. The method of claim 1, further comprising, after the difference between the synthetic data and the survey data has converged:
identifying an initial attenuation earth model to be the last current model; and
refining the initial attenuation earth model by inversion into a general attenuation earth model.

19. The method of claim 18, wherein the general attenuation earth model comprises differing attenuation parameters for differing wave propagation modes.

20. The method of claim 18, wherein the general attenuation earth model comprises anisotropic attenuation parameters for differing wave propagation modes.

21. A system for generating an image of a subsurface region comprising:
a data module comprising survey data for the subsurface region;
a model module comprising an initial physical property model of the subsurface region; and
an equation module comprising wave equations representing isotropic wave-mode-independent attenuation, comprising:
a representation of velocity in the subsurface region comprising a vector that accounts for attenuation effects; and
a representation of stress in the subsurface region comprising a vector that does not account for attenuation effects.

22. The system of claim 21, wherein the initial physical property model comprises a property representing arbitrary velocity anisotropy throughout at least a portion of the subsurface region.

23. The system of claim 21, wherein the wave equations comprise:

$$\rho \frac{\partial \vec{v}}{\partial t} = \Pi \vec{\sigma} - \sum_{l=1}^{L} \omega_l \vec{m}_l + \vec{S}_v,$$

$$\frac{\partial \vec{\sigma}}{\partial t} = C \Pi^T \vec{v} + \vec{S}_\sigma,$$

$$\frac{\partial \vec{m}_l}{\partial t} = -\omega_l \vec{m}_l + (a_l^T \Pi^T)^T \vec{\sigma},$$

where $\vec{\sigma} = (\sigma_{xx}\ \sigma_{yy}\ \sigma_{zz}\ \sigma_{yz}\ \sigma_{xz}\ \sigma_{xy})^T$ is the representation of stress, $\vec{m}_l = (m_x^l\ m_y^l\ m_z^l)^T$ is the representation of veloity, $\vec{v} = (v_x\ v_y\ v_z)^T$ is a velocity vector, C is a stiffness matrix representing the medium properties, L represents a number of modeled attenuation mechanisms, $\pi$ a matrix of spatial derivatives, p is density, $\omega_l$ is an $l^{th}$ relaxation frequency and l=1, 2, . . . , L, $\alpha_l$ is a matrix representing the $l^{th}$ relaxation modulus, and $\vec{S}_\sigma$ is a source of the stress.

24. A method for generating an image of a subsurface region, comprising:
   obtaining an initial physical property model and survey data for the subsurface region;
   identifying a current model to be the initial physical property model;
   iteratively executing:
   generating synthetic data and forward wavefields with the current model and the survey data by forward modeling with forward wave equations representing isotropic wave-mode-independent attenuation;
   generating adjoint wavefields with the synthetic data and the survey data by adjoint modeling with adjoint wave equations representing isotropic wave-mode-independent attenuation;
   computing an objective function gradient with the forward wavefields and the adjoint wavefields by solving gradient equations associated with the corresponding wave equations representing isotropic wave-mode-independent attenuation;
   computing a search direction of the objective function;
   searching for a possible improved model along the search direction;
   if the possible improved model more closely matches the survey data than the current model, updating the current model to be the possible improved model; and
   if a difference between the synthetic data and the survey data has not converged, executing another iteration; and
   after the difference between the synthetic data and the survey data has converged;
   identifying a final model to be the last current model; and
   generating an image of the subsurface region based on features of the final model.

25. The method of claim 24, wherein the initial physical property model comprises a property representing arbitrary velocity anisotropy throughout at least a portion of the subsurface region.

26. The method of claim 24, wherein:
   the forward wave equations comprise velocity-attenuation forward wave equations,
   the adjoint wave equations comprise velocity-attenuation adjoint wave equations, and
   the gradient equations comprise velocity-attenuation gradient equations.

27. A geophysical data analysis system comprising:
   a processor; and
   a display configured to display graphical representations of a geophysical data set, wherein the geophysical data analysis system is configured to:
   obtain an initial physical property model and survey data for the subsurface region;
   identify a current model to be the initial physical property model;
   iteratively execute:
   generate synthetic data and forward wavefields with the current model and the survey data by forward modeling with forward wave equations representing isotropic wave-mode-independent attenuation;
   generate adjoint wavefields with the synthetic data and the survey data by adjoint modeling with adjoint wave equations representing isotropic wave-mode-independent attenuation;
   compute an objective function gradient with the forward wavefields and the adjoint wavefields by solving gradient equations associated with the corresponding wave equations representing isotropic wave-mode-independent attenuation;
   compute a search direction of the objective function;
   search for a possible improved model along the search direction;
   if the possible improved model more closely matches the survey data than the current model, update the current model to be the possible improved model; and
   if a difference between the synthetic data and the survey data has not converged, execute another iteration; and
   after the difference between the synthetic data and the survey data has converged:
   identify a final model to be the last current model; and
   generate an image of the subsurface region based on features of the final model.

28. The system of claim 27, wherein the initial physical property model comprises a property representing arbitrary velocity anisotropy throughout at least a portion of the subsurface region.

29. The method of claim 27, wherein:
   the forward wave equations comprise velocity-attenuation forward wave equations,
   the adjoint wave equations comprise velocity-attenuation adjoint wave equations, and
   the gradient equations comprise velocity-attenuation gradient equations.

* * * * *